United States Patent
Fischer

(10) Patent No.: US 6,676,154 B2
(45) Date of Patent: Jan. 13, 2004

(54) VEHICLE OCCUPANT PROTECTION SYSTEM COMPRISING A GAS BAG

(75) Inventor: Anton Fischer, Leinweiler (DE)

(73) Assignee: TRW Occupant Restraint Systems GmbH & Co. KG, Aldorf (DE)

( * ) Notice: Subject to any disclaimer, the term of this patent is extended or adjusted under 35 U.S.C. 154(b) by 0 days.

(21) Appl. No.: 09/939,362

(22) Filed: Aug. 24, 2001

(65) Prior Publication Data

US 2002/0024204 A1 Feb. 28, 2002

(30) Foreign Application Priority Data

Aug. 25, 2000 (DE) .................................. 200 14 705 U
Jan. 23, 2001 (DE) .................................. 201 01 118 U

(51) Int. Cl.⁷ .......................... B60R 21/22; B60R 21/24
(52) U.S. Cl. .................. 280/729; 280/730.2; 280/743.2
(58) Field of Search ............................. 280/729, 730.2, 280/730.1, 743.2, 743.1, 749

(56) References Cited

U.S. PATENT DOCUMENTS 6,095,551 A * 8/2000 O'Docherty ............. 280/730.2
6,237,943 B1 * 5/2001 Brown et al. ............. 280/730.2

FOREIGN PATENT DOCUMENTS

| DE | 29610920 U1 | 10/1996 |
| DE | 19654490 A1 | 6/1998 |
| DE | 19824601 A1 | 12/1999 |
| WO | WO9743146 | 11/1997 |
| WO | WO0007854 | 2/2000 |

* cited by examiner

Primary Examiner—Peter C. English
(74) Attorney, Agent, or Firm—Tarolli, Sundheim, Covell & Tummino L.L.P.

(57) ABSTRACT

The invention relates to a vehicle occupant protection system, comprising a gas bag which has at least one inflatable chamber defined by a wall. The protection system further comprises a tensioning strap which fixes the gas bag in position in an inflated state. The tensioning strap is fully looped around the wall of the chamber and fastened to the wall and to the vehicle in such a manner that inflating the chamber causes a displacement of the tensioning strap and a tightening of the tensioning strap.

24 Claims, 2 Drawing Sheets

VEHICLE OCCUPANT PROTECTION SYSTEM COMPRISING A GAS BAG

TECHNICAL FIELD

The invention relates to a vehicle occupant protection system comprising a gas bag, in particular a side gas bag.

BACKGROUND OF THE INVENTION

Especially in vehicle occupant protection systems with side window gas bags, frequently tensioning straps are used to fix the gas bag in position in a vehicle. In the case of side window gas bags which in the unfolded state extend from the A- to the C-column of the vehicle and which in the folded state are arranged in the region of the vehicle roof, the problem exists that owing to the curvature of the roof frame, the length of the gas bag in the folded state is greater than the desired length in the inflated state. It is known to achieve an anchoring of the gas bag via a shortening of the length of the tensioning straps which are used for fixing the gas bag in position. This can take place for example by a spring mechanism arranged in the region of the A-column or C-column or a piston/cylinder device. Such devices for tensioning the tensioning strap are expensive to produce and are complicated to install on the vehicle.

BRIEF SUMMARY OF THE INVENTION

The invention addresses the problem of providing a vehicle occupant protection device which offers a simple and favorably-priced anchoring of the gas bag.

This is achieved in a vehicle occupant protection system comprising a gas bag which has at least one inflatable chamber including a wall. The protection system further comprises a tensioning strap which fixes the gas bag in position in an inflated state. The tensioning strap is fully looped around the wall of the inflatable chamber and fastened to the wall and to the vehicle in such a manner that inflating the chamber causes a displacement of the tensioning strap and a tightening of the tensioning strap. The looping around the chamber, with the tensioning strap going completely around the chamber, allows for a particularly good use of an increase in volume of the chamber. During filling of the gas bag, the increase in volume of the chamber which has the tensioning strap looped around it provides for those sections of the tensioning strap which are located in direct vicinity to the chamber, to experience a force oriented towards the chamber and to be pulled into the section of the tensioning strap which loops around the chamber. These sections of the tensioning strap are regarded as being located in direct vicinity to the chamber which before or during the filling of the gas bag adjoin directly to the section looping around the chamber. Thus, an effective "shortening" of the tensioning strap and with this an anchoring of the gas bag can be achieved. As in the way the gas itself is used for tightening the tensioning strap, a further mechanism can be dispensed with, which reduces costs and effort.

The tensioning strap is displaceable with respect to the wall of the chamber, so that during filling of the chamber the adjoining sections of the tensioning strap can be "pulled into" the section looping around the chamber.

In order to not hinder the tensioning strap from moving relative to the chamber, it is favorable if the tensioning strap loops around the chamber in a spiral fashion.

The distance, contributing to the anchoring, by which the tensioning strap is shortened through the increase in volume of the chamber which has the strap looped around it, can be increased in that the tensioning strap is laid around the chamber in at least two loops.

Preferably the gas bag has several chambers, and the chamber which has the tensioning strap looped around it, hereinafter named the anchoring chamber, serves principally for tightening the tensioning strap, whilst the other chambers are provided for restraining purposes.

Preferably the anchoring chamber has a higher internal pressure and, where appropriate, a wall which is more gas-tight than the other chambers. As no consideration has to be given to the restraining characteristics of the anchoring chamber, it can be optimized to its anchoring purpose by adjusting the pressure and the gas-tightness.

For this purpose, preferably a gas distributor is provided via which gas, which is generated by a gas generator in the case of restraint, is directed into the individual chambers, the gas distributor being designed such that in the inflated state a different pressure can prevail in the individual chambers. By means of such a known gas distributor, which may also be embodied as a gas lance, the higher internal pressure of the anchoring chamber can be realized, as compared with the other restraint chambers.

In a preferred embodiment of the invention, the gas bag is a side window gas bag. The tensioning strap preferably runs substantially parallel to the lower edge of the side windows of the vehicle. It is particularly advantageous if the side window gas bag has three inflatable chambers arranged adjacent each other, the tensioning strap being looped around the central chamber. The anchoring effect occurs particularly clearly if the chambers of the gas bag are connected with each other at the lower edge only by means of the tensioning strap. As seen in a projection onto a plane parallel to the side windows of the vehicle, the section of the tensioning strap looping around the chamber runs in this embodiment preferably parallel to a lower edge of the side windows of the vehicle, so that the tensioning strap extends along an imaginary straight line between fastening points on the vehicle, whereby a uniform anchoring of the lower edge of the gas bag can be achieved.

Preferably the ends of the tensioning strap are fastened to the walls of the two outer chambers. The walls of the outer chambers can be fastened in addition by means of further tensioning straps to vehicle-fixed parts. In this way, the overall length of the tensioning strap can be kept as short as possible, and a correct unfolding of the gas bag can be achieved.

Another alternative makes provision that the ends of the tensioning strap are connected directly to vehicle-fixed parts. In this case, only a single long tensioning strap can be provided which loops around the central chamber and runs for example through eyes on the outer chambers and can be fastened to the A- and C-column of the vehicle. Thereby, sewing the tensioning strap to the individual walls of the chambers can be avoided.

In a further preferred embodiment of the invention a deflection member is provided which is connected to a vehicle part such as the A- or the C-column and which is arranged in the run of the tensioning strap between the chamber which has the strap looped around it and a fastening point of the tensioning strap on the gas bag. That is, the tensioning strap can run from a fastening point on the gas bag through the deflection member to the chamber. A particularly suitable variant makes provision that the tensioning strap runs from the chamber which has the strap looped around it, to a second deflection member and from there to a second fastening point located at the other end of the gas bag. In this way the gas bag can be anchored by means of only one tensioning strap.

Preferably, the chamber which has the tensioning strap looped around it extends only in the region of the roof frame, i.e. it does not reach the lower edge of the side windows. As this chamber mainly serves for anchoring the gas bag and not so much for restraining, gas bag volume can be saved in this way. An additional advantage of this arrangement lies in the fact that, with the above-mentioned three-chamber design of the gas bag, a run of the tensioning strap may be chosen in which the tensioning strap extends obliquely along the restraint chambers and thus the latter can be fixed in position when the side windows are destroyed, for example.

DETAILED DESCRIPTION OF THE PREFERRED EMBODIMENTS

Figure 1:
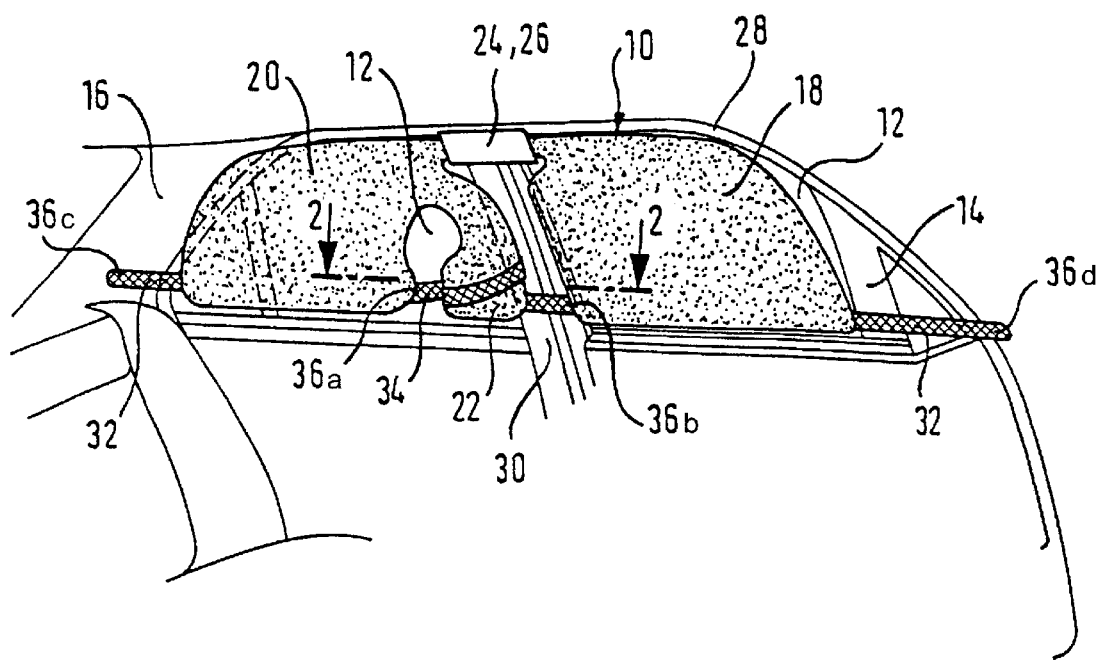
FIG. 1 shows a vehicle with a vehicle occupant protection system according to the invention and according to a first embodiment, in diagrammatic representation.

FIG. 1 shows a vehicle occupant protection system in a first embodiment, comprising an inflated side window gas bag 10 which extends in the region of the side windows 12 of a vehicle substantially from the A-column 14 to the C-column 16 of the vehicle. The gas bag 10 has three chambers, a front and a rear restraint chamber 18, 20 and a tubular anchoring chamber 22 extending approximately vertically downwards and arranged between the two restraint chambers 18, 20. At the lower edge of the gas bag, the chambers 18, 20, 22 are separated from each other by breaks. In the case of restraint, the chambers of the gas bag 10 are supplied with gas by a gas generator 24 with a gas distributor 26 which is arranged in the region of the roof frame 28 above the B-column 30 of the vehicle. The gas distributor 26 is designed here in a known manner such that in the individual chambers 18, 20, 22 a different internal pressure is set. Provision is made that the anchoring chamber 22 has a higher internal pressure than the two restraint chambers 18, 20. The wall of the anchoring chamber 22 may also have a higher gas-tightness than the walls of the chambers 18 and 20.

The anchoring of the gas bag is achieved by tensioning straps 32, 34. The tensioning straps 32 are fastened to the A- and C-column, respectively, and also to the walls of the restraint chambers 18, 20 e.g. by seams, whilst the tensioning strap 34 is looped around the anchoring chamber 22 in the region of the lower edge of the gas bag 10. The ends 36a, 36b of the tensioning strap 34 are fastened for example by seams to the walls of the chambers 18, 20 directed towards the anchoring chamber 22. The tensioning straps 32, 34 run substantially parallel to the lower edge of the side windows 12. The tensioning strap 34 is fastened such that it can move in relation to the wall of the chamber 22, e.g. by means of eyes 38.

Instead of three tensioning straps, a single continuous tensioning strap can also be provided, which is fastened by its ends 36c, 36d to A- and C-column. This tensioning strap can be guided on the restraint chambers 18, 20 in eyes.

Figure 2A:
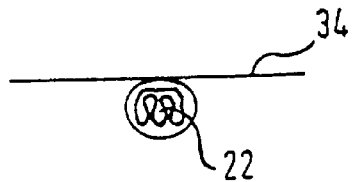
FIGS. 2a and 2b show a section along the line 2—2 of FIG. 1 in a folded state and also in an inflated state of the gas bag.
Figure 2B:
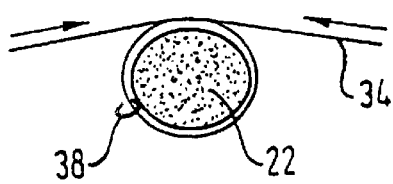

The achieving of the anchoring effect is described hereinbelow. The tensioning strap fully loops around the anchoring chamber 22 in terms of circumference already in the folded state of the gas bag, as is illustrated in FIG. 2a. The tensioning strap 34 lies here closely against the folded chamber 22. On inflation of the chamber 22 by gas from the gas generator 24, the diameter of the chamber 22 enlarges and the ends 36a, 36b of the tensioning strap 34 are moved towards each other in the arrow direction (FIG. 2b). Hereby, a shortening of those sections of the tensioning strap 34 takes place which are not in contact with the wall of the chamber 22, whereby due to the connection of the tensioning strap 34 to the restraint chambers 18, 20 the lower edges of the restraint chambers 18, 20 are moved towards each other and so a tightening of the tensioning strap 34 and an anchoring of the gas bag is achieved. The amount of shortening can be set via the diameter of the anchoring chamber 22 and at that point at which it is looped around by the tensioning strap 34.

Figure 3:
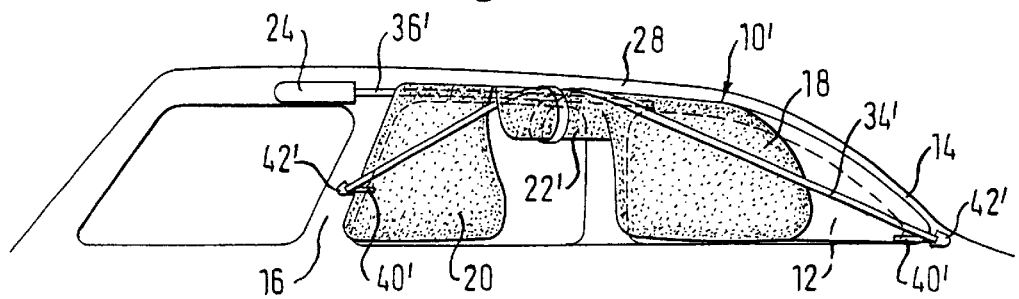
FIG. 3 shows a vehicle with a vehicle occupant protection system according to the invention and according to a second embodiment, in diagrammatic representation.
Figure 4:
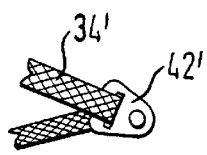
FIG. 4 shows a detail from FIG. 3.
Figure 5A:
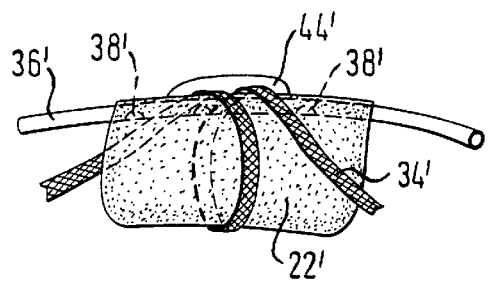
FIGS. 5a and 5b show different variants of how to lay the tensioning strap around the chamber which is looped around by it.

In FIGS. 3 to 5 there is illustrated a second embodiment of the invention. For already known components, the already used reference numerals are maintained, for modified and new components an apostrophe is added to the reference numeral.

The gas bag 10' used in this embodiment likewise has three chambers 18, 20, 22', of which two extend in the region of the front and rear side windows 12 and which are constructed as restraint chambers, whilst the third one, lying between the restraint chambers 18, 20, is constructed as an anchoring chamber 22'. In the inflated state the chamber 22' is arranged in the region of the roof frame 28 and extends not so far towards the lower edge of the side windows 12 than the restraint chambers 18, 20. Chamber 22' may have, for instance, the shape of a horizontally arranged, short hose.

In the case of restraint, the gas bag 10' is filled with gas from a gas generator 24. The gas preferably flows through a gas lance 36' and openings 38' into the chambers 18, 20, 22'. By selecting the number and the diameter of the openings 38' to the individual chambers, a pressure may be realized in the anchoring chamber 22' which is higher than in the restraint chambers 18, 20.

Figure 5B:
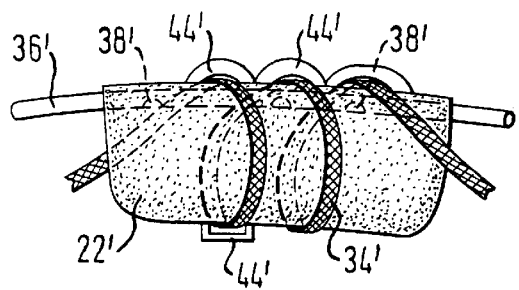

A tensioning strap 34' is fastened to the gas bag at fastening points 40' on both ends of the latter, as seen in the direction of the longitudinal axis of the vehicle. The tensioning strap 34' runs from the fastening points 40' through deflection members 42' mounted to the A-column 14 and the C-column 16, respectively (in detail in FIG. 4). From the deflection members 42', sections of the tensioning strap 34' each run obliquely across the restraint chambers 18, 20 up to the chamber 22' which has the tensioning strap 34' looped around it. The looping around takes place preferably in a spiral fashion, so that the tensioning strap does not contact itself in the region of the looped portion. The tensioning strap may either be laid around the chamber 22' once (FIG. 5a) or twice (FIG. 5b). A higher number of loops is also conceivable. Preferably a narrow belt webbing is selected as the material for the tensioning strap.

In order to prevent a displacement of the tensioning strap 34' in relation to the chamber 22', the tensioning strap 34' may be guided for the looped portions through eyes 44' constructed on the chamber 22'.

All three chambers 18, 20, 22' of the gas bag 10' are connected with each other preferably by non-inflatable sections. The eyes 44' through which the tensioning strap runs for looping around the chamber 22', may be manufactured in a known manner in a non-inflatable section.

When not inflated, the gas bag 10' is stowed in the region of the roof frame. The sections of the tensioning strap 34' that run to the deflection members 42' may, for instance, be accommodated in the lining of the A-column and the C-column 16.

If the gas bag is inflated in the case of restraint, inflation of the chamber 22' causes a retraction of the tensioning strap 34' towards the chamber 22' and thus provides for shortening of the effective length of the tensioning strap 34'. Since the tensioning strip 34' runs through the deflection members 42', a force is exerted on the fastening points 40' which acts in the direction towards the deflection members, whereby the gas bag 10' is anchored. The two fastening points 40' are preferably arranged so as to be relatively close to the gas bag lower edge, in order to anchor the gas bag across as large an area as possible. As is preferred, the fastening points 40' lie on one level with respect to the lower edge of gas bag 10', to receive an optimum distribution of anchoring forces in the gas bag. The sections of the tensioning strap 34' that run obliquely along the restraint chambers 18, 20 cause an additional stiffening of the gas bag 10'.

The state of the chamber 22' having the strap looped around it exists already in the non-inflated, folded state of the gas bag, so that the increase in length of the section, looping around the chamber 22', of the tensioning strap 34' is maximum on inflation. Selecting the diameter of chamber 22' and the number of loops determines the length by which the tensioning strap is shortened. In the embodiment illustrated, the shortening may amount to approximately 10–50 cm.

Of course, also in the first embodiment the tensioning strap can be looped several times around the chamber 22.

What is claimed is:

1. A vehicle occupant protection system comprising:
   a side window gas bag which has at least three inflatable chambers each defined by a wall, said three inflatable chambers being arranged adjacent to each other along an imaginary straight line, and
   a tensioning strap which fixes said gas bag in position in an inflated state,
   said tensioning strap being fully looped around said wall of a central one of said three inflatable chambers and fastened to said wall of said central inflatable chamber and to a vehicle in such a manner that inflating said central inflatable chamber causes a displacement of said tensioning strap and a tightening of said tensioning strap around said wall of said central inflatable chamber.

2. The vehicle occupant protection system according to claim 1 wherein said three inflatable chambers are spaced apart from each other along a side structure of the vehicle.

3. The vehicle occupant protection system according to claim 1, wherein said tensioning strap is looped around said central one of said three inflatable chambers in such a manner that, on inflating said central inflatable chamber, sections of said tensioning strap which are located in direct vicinity to said central inflatable chamber experience a force oriented towards said central inflatable chamber.

4. A vehicle occupant protection system comprising:
   a side window gas bag which has at least three inflatable chambers each defined by a wall, said three inflatable chambers being arranged adjacent to each other along an imaginary straight line, and
   a tensioning strap which fixes said gas bag in position in an inflated state,
   said tensioning strap being fully looped around said wall of a central one of said three inflatable chambers and fastened to said wall of said central inflatable chamber and to a vehicle in such a manner that inflating said central inflatable chamber causes a displacement of said tensioning strap and a tightening of said tensioning strap around said wall of said central inflatable chamber.

5. The vehicle occupant protection system according to claim 1, wherein said tensioning strap is looped around said wall of said central one of said three inflatable chambers at least twice.

6. The vehicle occupant protection system according to claim 1, wherein said central one of said three inflatable chambers has a higher internal pressure than the remaining inflatable chambers in the inflated state of said gas bag.

7. The vehicle occupant protection system according to claim 6, wherein said wall of said central one of said three inflatable chambers has a higher gas-tightness than walls of the remaining inflatable chambers.

8. The vehicle occupant protection system according to claim 1, wherein a gas distributor is provided, via which gas is directed into said inflatable chambers, said gas distributor being designed such that in said inflated state a different pressure can prevail in each of said inflatable chambers.

9. The vehicle occupant protection system according to claim 1, wherein a gas generator is provided which is arranged on a roof frame in a region of a B-column of said vehicle.

10. The vehicle occupant protection system according to claim 1, wherein said vehicle has side windows with a lower edge, said tensioning strap running substantially parallel to said lower edge of said side windows of said vehicle.

11. The vehicle occupant protection system according to claim 10, wherein said gas bag when installed and inflated has a lower edge and wherein said inflatable chambers are connected with each other at said lower edge of said gas bag only by means of said tensioning strap.

12. The vehicle occupant protection system according to claim 1, wherein said tensioning strap has ends and wherein vehicle fixed parts are provided to which said ends of said tensioning strap are fastened.

13. The vehicle occupant protection system according to claim 1, wherein a deflection member is connected to a vehicle-fixed part and said tensioning strap runs through said deflection member and is fastened to said vehicle via said deflection member and is also fastened to outer inflatable chambers adjacent to said central inflatable chamber.

14. The vehicle occupant protection system according to claim 1, wherein said tensioning strap runs obliquely along two outer inflatable chambers of said three inflatable chambers.

15. The vehicle occupant protection system according to claim 1, wherein said tensioning strap is looped around said central one of said three inflatable chambers in a spiral fashion.

16. The vehicle occupant protection system according to claim 1, wherein said central chamber has a smaller vertical dimension than the other chambers.

17. The vehicle occupant protection system according to claim 1 wherein only a single loop of said tensioning strap is looped around said wall of said central inflatable chamber.

18. A vehicle occupant protection system comprising:
   a side window gas bag which has at least three inflatable chambers arranged adjacent to each other, each defined by a wall, and a tensioning strap which fixes said gas bag in position in an inflated state, said tensioning strap being fully looped around said wall of a central one of said three inflatable chambers and fastened to said wall of said central inflatable chamber and to a vehicle in such a manner that inflating said central inflatable chamber causes a displacement of said tensioning strap and a tightening of said tensioning strap around said wall of said central inflatable chamber, said tensioning strap running substantially parallel to a lower edge of a side window of said vehicle, said gas bag, when installed and inflated, having a lower edge and said three inflatable chambers being connected with each other at said lower edge of said gas bag only by means of said tensioning strap.

19. A vehicle occur ant protection system comprising:

a side window gas bag which has at least one inflatable chamber defined by a wall, and a tension strap which fixes said gas bag in position in an inflated state, said tensioning strap being fully looped around said wall of said inflatable chamber and fastened to said wall of said inflatable chamber and to a vehicle in such a manner that inflating said inflatable chamber causes a displacement of said tensioning strap and a tightening of said tensioning strap, said vehicle having a side window with a lower edge and said tensioning strap running substantially parallel to said lower edge of said side window throughout the extent of said tensioning strap.

20. The vehicle occupant protection system according to claim 19, wherein said inflatable chamber around which the tensioning strap is looped extends in a substantially vertically downward direction in said vehicle.

21. The vehicle occupant protection system according to claim 19, wherein said inflatable chamber around which said tensioning strap is fully looped applies a force to said tensioning strap which is substantially parallel to said lower edge of said side window of said vehicle.

22. A vehicle occupant protection system comprising:

a side window gas bag which has at least three inflatable chambers each defined by a wall, said three inflatable chambers being arranged adjacent to each other along an imaginary straight line, and tensioning strap means which fixes said gas bag in position in an inflated state, said tensioning strap means being fully looped around said wall of a central one of said three inflatable chambers and fastened to a vehicle in such a manner that inflating said central inflatable chamber causes a displacement of said tensioning strap means and a tightening of said tensioning strap means around said wall of said central inflatable chamber and a tensioning of said tensioning strap means.

23. A vehicle occupant protection system comprising:

a side window gas bag which has at least three inflatable chambers each defined by a wall, said three inflatable chambers being arranged adjacent to each other along an imaginary straight line, and a tensioning strap for fixing said gas bag in position in an inflated state, said tensioning strap being fully looped around said wall of a central one of said three inflatable chambers and fastened to said wall of two adjacent outer chambers, inflation of said central inflatable chamber causing a displacement of said tensioning strap and a tightening of said tensioning strap.

24. A vehicle occupant protection system comprising:

a side window gas bag for extending across a side window of a vehicle, said gas bag having at least three inflatable chambers including a central chamber and two outer chambers and each defined by a wall, said three inflatable chambers being arranged adjacent to each other along an imaginary straight line, and a plurality of tensioning straps for fixing said gas bag in position in an inflated state, one of said plurality of tensioning straps being fastened to a first one of said two outer inflatable chambers and to the vehicle, another one of said plurality of tensioning straps being fastened to a second one of said two outer inflatable chambers and to the vehicle, yet another one of said plurality of tensioning straps being fully looped around said wall of said central inflatable chamber and fastened to said wall of said central inflatable chamber and to each wall of said two outer inflatable chambers in such a manner that inflating said central inflatable chamber causes a displacement of said looped tensioning strap and a tightening of said tensioning strap around said wall of said central inflatable chamber.

* * * * *

UNITED STATES PATENT AND TRADEMARK OFFICE
CERTIFICATE OF CORRECTION

PATENT NO. : 6,676,154 B2
DATED : January 13, 2004
INVENTOR(S) : Anton Fischer

It is certified that error appears in the above-identified patent and that said Letters Patent is hereby corrected as shown below:

<u>Column 6,</u>
Line 5, after "to" delete -- said wall of said central inflatable chamber and to --.
Line 10, after "chamber" insert -- and a tensioning of said tensioning strap means --.

<u>Column 8,</u>
Line 46, before "tensioning" insert -- looped --.

Signed and Sealed this

Twenty-fifth Day of May, 2004

JON W. DUDAS
*Acting Director of the United States Patent and Trademark Office*